United States Patent

Ogawa

(10) Patent No.: US 10,460,236 B2
(45) Date of Patent: Oct. 29, 2019

(54) NEURAL NETWORK LEARNING DEVICE

(71) Applicant: TOYOTA JIDOSHA KABUSHIKI KAISHA, Toyota-shi, Aichi-ken (JP)

(72) Inventor: Masahiro Ogawa, Toyota (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 808 days.

(21) Appl. No.: 15/180,310

(22) Filed: Jun. 13, 2016

(65) Prior Publication Data

US 2017/0039471 A1    Feb. 9, 2017

(30) Foreign Application Priority Data

Aug. 7, 2015  (JP) ................. 2015-157089

(51) Int. Cl.
  *G06N 3/08*  (2006.01)
  *G06N 3/04*  (2006.01)

(52) U.S. Cl.
  CPC .......... *G06N 3/082* (2013.01); *G06N 3/04* (2013.01); *G06N 3/08* (2013.01)

(58) Field of Classification Search
  CPC ....................... G06N 3/082
  See application file for complete search history.

(56) References Cited

U.S. PATENT DOCUMENTS

| 5,627,941 A | 5/1997 | Takahashi et al. |
| 2015/0006444 A1 | 1/2015 | Tamatsu et al. |
| 2018/0025273 A1* | 1/2018 | Jordan ............ G06Q 40/00 706/21 |

(Continued)

FOREIGN PATENT DOCUMENTS

| JP | 5-197821 A | 8/1993 |
| JP | 6-75934 A | 3/1994 |

(Continued)

OTHER PUBLICATIONS

Floreano, Dario et al.; Neuroevolution: from architectures to learning; Springer-Verlag; Evol. Intel. (2008) 1:47-62. (Year: 2008).*

(Continued)

*Primary Examiner* — Stanley K. Hill
(74) *Attorney, Agent, or Firm* — Sughrue Mion, PLLC

(57) ABSTRACT

A neural network learning device includes a learning unit configured to perform a learning process that learns a neural network using a plurality of learning data sets. The learning process includes a data reading process, a synaptic weight correction process, a neuron generation process, and a neuron removal process. The neural network learning device includes an intermediate layer generation unit configured to perform an intermediate layer generation process. The intermediate layer generation process newly generates an additional intermediate layer including at least one neuron as an intermediate layer of the neural network when a loss function is greater than a predetermined second threshold value after the learning process is performed. When the additional intermediate layer is newly generated by the intermediate layer generation process, the learning unit performs the learning process again, using the neural network in which the additional intermediate layer has been generated.

1 Claim, 3 Drawing Sheets

(56) References Cited

U.S. PATENT DOCUMENTS

| | | | |
|---|---|---|---|
| 2018/0114114 A1* | 4/2018 | Molchanov | G06N 3/082 |
| 2019/0042911 A1* | 2/2019 | Koren | G06N 3/04 |
| 2019/0147339 A1* | 5/2019 | Nachum | G06N 20/00 |

FOREIGN PATENT DOCUMENTS

| | | |
|---|---|---|
| JP | 9-185595 A | 7/1997 |
| JP | 2001-256212 A | 9/2001 |
| JP | 2005-182449 A | 7/2005 |
| JP | 2015-11510 A | 1/2015 |

OTHER PUBLICATIONS

Natsuki Oka et al., "Refining, Adding, and Deleting Rules with a Competitive Radial Basis Neural Network", Artificial Intelligence, Information Processing Society of Japan, NII Electronic Library Service, Jun. 20, 1994, pp. 19-28, vol. 94, No. 3.

Kenneth O. Stanley et al., "Evolving Neural Networks through Augmenting Topologies", Evolutionary Computation, 2002, pp. 99-127, vol. 10, No. 2, Massachusetts Institute of Technology.

* cited by examiner

NEURAL NETWORK LEARNING DEVICE

TECHNICAL FIELD

The present invention relates to a neural network learning device.

BACKGROUND

As a technique related to neural network learning devices according to the related art, Japanese Unexamined Patent Publication No. H9-185595 discloses a sandglass-type neural network extension learning method. The learning method disclosed in Japanese Unexamined Patent Publication No. H9-185595 extends an intermediate layer of a sandglass-type neural network in stages and obtains a sandglass-type neural network including an intermediate layer with the minimum dimensions.

SUMMARY

In the related art, the neural network is limited to a sandglass type and the number of neurons in each intermediate layer is fixed. The intermediate layer is extended and the neural network is learned. As a result, the number of intermediate layers is likely to be unnecessarily large. Therefore, in the related art, it is necessary to optimize the structure of a neural network.

The invention is to provide a neural network learning device which can optimize the structure of a neural network.

According to an aspect of the invention, there is provided a neural network learning device that learns a hierarchical neural network having an input initial structure or a predetermined initial structure. The neural network learning device includes a learning unit configured to perform a learning process that learns the neural network using a plurality of learning data sets. The learning process includes: a data reading process that reads the learning data from a database; a synaptic weight correction process that calculates a loss function of the neural network using the learning data and corrects a synaptic weight of the neural network according to the loss function, when the learning data is read by the data reading process; a neuron generation process that newly generates a neuron in an intermediate layer of the neural network when the loss function is greater than a predetermined first threshold value after the synaptic weight correction process is performed; and a neuron removal process that removes some of the neurons in the intermediate layer when the sum of the synaptic weights of a plurality of neurons in the intermediate layer of the neural network is less than a predetermined reference sum after the synaptic weight correction process is performed. When the neuron is newly generated by the neuron generation process or when some of the neurons are removed by the neuron removal process, the synaptic weight correction process calculates the loss function again, using the learning data, and corrects the synaptic weight again according to the loss function. The neural network learning device further includes an intermediate layer generation unit configured to perform an intermediate layer generation process that newly generates an additional intermediate layer including at least one neuron as the intermediate layer of the neural network when the loss function is greater than a predetermined second threshold value after the learning process is performed. When the additional intermediate layer is newly generated by the intermediate layer generation process, the learning unit performs the learning process again, using the neural network in which the additional intermediate layer has been generated.

In the neural network learning device, it is possible to adjust the number of neurons to an optimal value corresponding to the loss function and the synaptic weight. In addition, it is possible to adjust the number of intermediate layers to an optimal value corresponding to the loss function. Therefore, it is possible to optimize the structure of a neural network.

DETAILED DESCRIPTION

Figure 1:
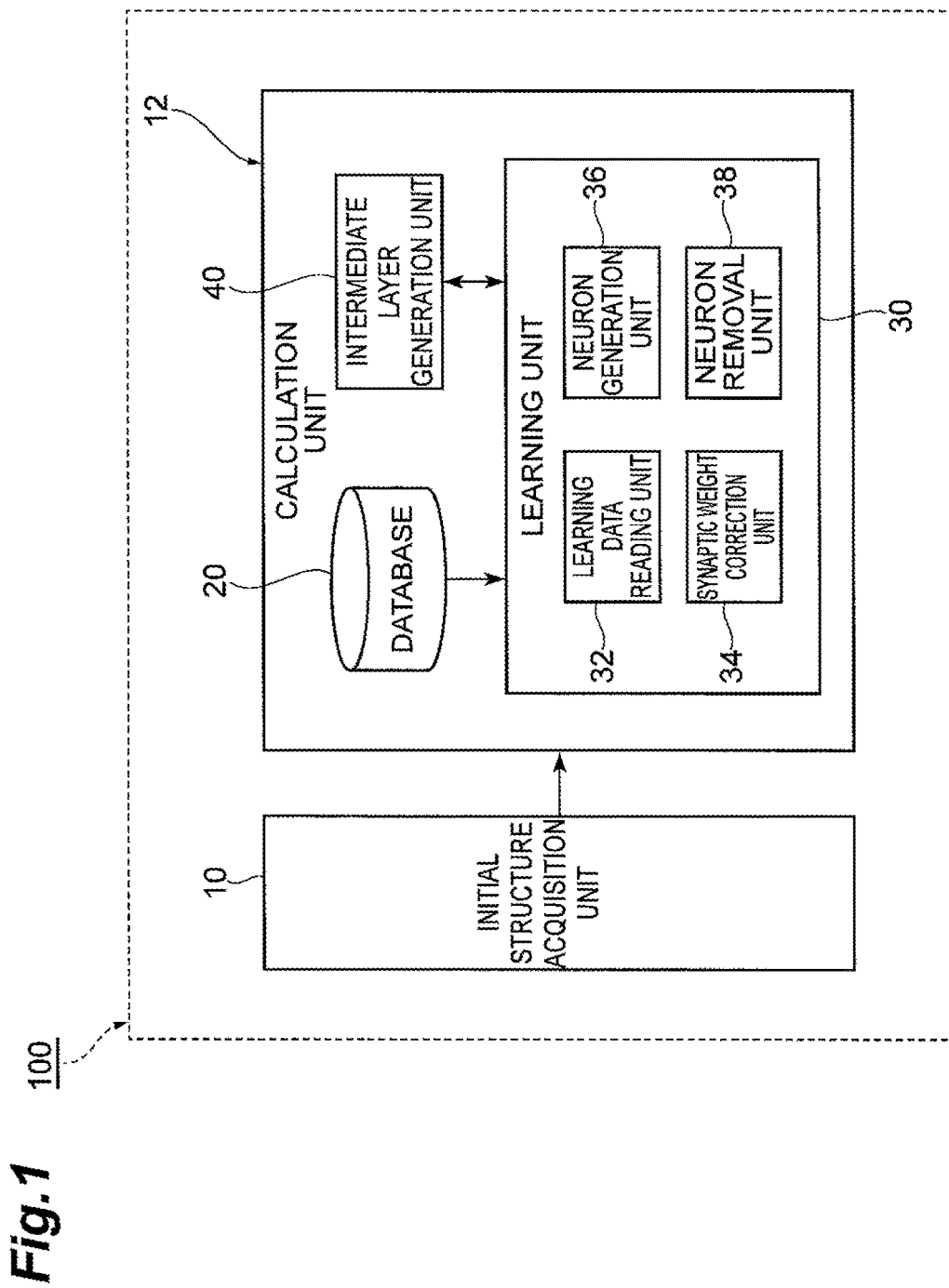
FIG. 1 is a block diagram illustrating the structure of a neural network learning device according to an embodiment.

Hereinafter, an embodiment of the invention will be described in detail with reference to the drawings. In the following description, the same or similar components are denoted by the same reference numerals and the description thereof will not be repeated.

Figure 2:
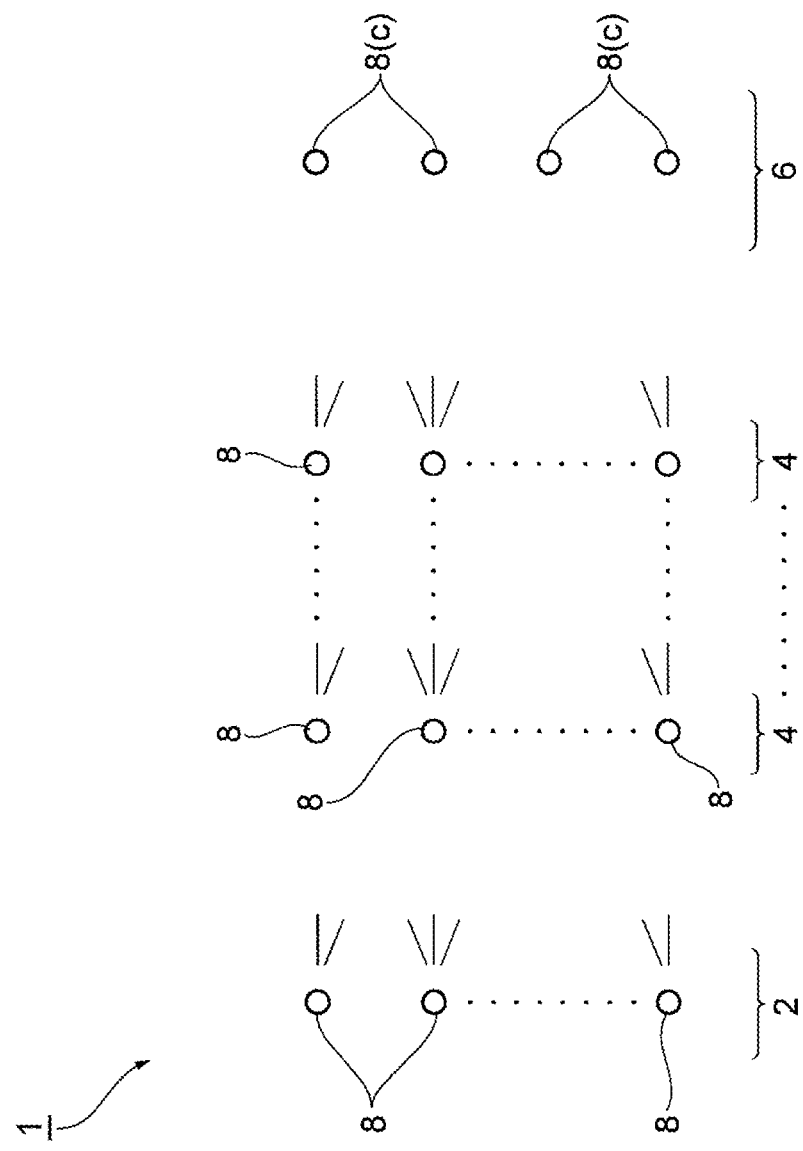
FIG. 2 is a diagram illustrating the structure of a neural network in the neural network learning device illustrated in FIG. 1.

FIG. 1 is a block diagram illustrating the structure of a neural network learning device according to the embodiment. FIG. 2 is a diagram illustrating the structure of a neural network in the neural network learning device illustrated in FIG. 1. As illustrated in FIG. 1, a neural network learning device 100 learns and optimizes a hierarchical neural network with an input initial structure or a predetermined initial structure.

The neural network is a mathematical model which simulates an information processing mechanism of the human brain. The neural network processes necessary information through a learning process. The neural network can be applied to, for example, a pattern recognition process and an associative storage process. An optimized neural network obtained by the neural network learning device 100 means a neural network having an appropriate network structure which outputs an answer to the problem to be solved. First, an example of the hierarchical neural network to be learned by the neural network learning device 100 will be described.

As illustrated in FIG. 2, a neural network 1 includes an input layer 2, one or a plurality of intermediate layers 4, and an output layer 6. The input layer 2, the intermediate layer 4, and the output layer 6 include $n_i$, $n_m$, and $n_o$ neurons 8, respectively. In the example illustrated in FIG. 2, the output layer 6 is a four-dimensional layer including four neurons 8 such that four classes of patterns can be recognized.

The neuron 8 is an element forming the neural network 1. The neuron 8 is a mathematical model which does not strictly simulate a nerve cell of a living body, but is obtained by extracting a specific function of a nerve cell and simplifying the function. The neuron 8 is also referred to as an element, a unit, or a neuron model. The intermediate layer 4 is also referred to as a hidden layer.

The number of intermediate layers 4 and the number of neurons $n_m$ in the intermediate layer 4 change adaptively, which will be described below. The neurons 8 of the input layer 2 which receive each component of input data x output the input data x without any change. The neurons 8 of the intermediate layer 4 receive the vector of the input data x and output reaction strength Bb(x) represented by the following Expression (1):

$$B_b(x) = S_b(x) / \sum_{a=1}^{n_m} S_a(x). \tag{1}$$

Here, Sa(x) is single reaction strength which is output from each neuron 8 of the intermediate layer 4 and is represented by the following Expression (2):

$$S_a(x) = \exp\left(-\frac{(x - \mu_a)^2}{2\sigma_a^2}\right). \tag{2}$$

In addition, $\mu_a$ is the reaction center of the neuron 8 and $\sigma_a$ is the reaction width of the neuron 8. The neurons 8 of the intermediate layer 4 have a competitive relationship therebetween and the sum of the reaction strengths of the neurons is maintained at 1 with respect to all inputs.

The neurons c of the output layer 6 receive the reaction strengths of each neuron 8 of the intermediate layer 4 which are weighted by synaptic weights w with the neurons 8 of the intermediate layer 4 and output the linear sum thereof. Output data y from the neural network 1 can be represented by the following Expression (3):

$$y = \sum_{b=1}^{n_m} w_b B_b(x). \tag{3}$$

In the following description, in some cases, the reaction center $\mu$, the reaction width $\sigma$, and the synaptic weight w are collectively represented by a parameter $\xi$. The synaptic weight is also referred to as, for example, a synaptic coefficient, a connection weight, or a weight.

As illustrated in FIG. 1, the neural network learning device 100 is an electronic control unit including, for example, a central processing unit (CPU), a read only memory (ROM), and a random access memory (RAM). In the neural network learning device 100, a program which is stored in the ROM is loaded to the RAM and the CPU executes the program to implement various types of control. The neural network learning device 100 includes a plurality of electronic control units. The neural network learning device 100 can be, for example, a general-purpose computer.

The neural network learning device 100 includes an initial structure acquisition unit 10 and a calculation unit 12. The initial structure acquisition unit 10 acquires the neural network 1 with an initial structure. For example, the initial structure acquisition unit 10 acquires the neural network 1 with the initial structure which is input from the outside or is set in advance. For example, in the neural network 1 with the initial structure, the intermediate layer 4 is a single layer, the number of neurons in the intermediate layer 4 is two or more, and the synaptic weight w of each neuron 8 is a predetermined initial weight value. The calculation unit 12 performs an operation of optimizing the neural network 1 with the initial structure acquired by the initial structure acquisition unit 10.

In this embodiment, the calculation unit 12 includes a database 20, a learning unit 30, and an intermediate layer generation unit 40. The database 20 stores a plurality of learning data sets (which are also referred to as learning samples) in advance. The learning data is used to learn the neural network 1. The learning data is represented by a set of input data and teacher data which is the norms of the results. The learning data can be obtained by, for example, measurement or simulation. The database 20 stores in advance a first threshold value th_e, a reference variation th_d, a reference number of times th_c, a reference sum th_w, and a reference number of neurons th_n which are used for the process of the learning unit 30 and will be described below. In addition, the database 20 stores in advance a second threshold value th_e2 and a reference addition number N1 which are used for the process of the intermediate layer generation unit 40 and will be described below.

The learning unit 30 performs a learning process for learning the neural network 1 using a plurality of learning data sets. The learning process includes a data reading process, a synaptic weight correction process, a neuron generation process, and a neuron removal process. The learning unit 30 includes a learning data reading unit 32, a synaptic weight correction unit 34, a neuron generation unit 36, and a neuron removal unit 38.

The learning data reading unit 32 performs the data reading process. The data reading process is a process of reading learning data from the database 20. For example, in the data reading process, one of a plurality of learning data sets stored in the database 20 is read. The learning data reading unit 32 outputs the read learning data to the synaptic weight correction unit 34.

The synaptic weight correction unit 34 performs the synaptic weight correction process. When learning data is read by the data reading process of the learning data reading unit 32, the synaptic weight correction process calculates a loss function of the neural network 1, using the learning data, and corrects the synaptic weight w of the neural network 1 according to the calculated loss function. For example, in the synaptic weight correction process, the synaptic weight w is corrected by a back propagation method.

The back propagation method is one of the learning methods for learning the neural network 1 and determines the synaptic weight of the neural network 1 on the basis of the learning data. The back propagation method compares teacher data for input data with the actual output data obtained from the neural network 1 and changes each synaptic weight w from the output layer 6 to the input layer 2 on the basis of an error between the teacher data and the actual output data. The loss function can be calculated as a value based on the sum of the losses of the neural network 1 by a plurality of learning data sets. For example, output data from the neural network 1 can be evaluated by a square error. Therefore, when attention is paid to one learning data set, a loss function r can be calculated by the following Expression (4):

$$r(x, \xi) = \frac{1}{2}\{y(x, \xi) - z(x)\}^2. \tag{4}$$

In Expression 4, z is teacher data. The loss function is also referred to as, for example, a loss coefficient, an error function, a learning error, or an error.

The loss function can be differentiated by the parameter $\xi$ of the network. For example, when a probabilistic descent method is used as a learning rule in which the square error is the minimum, a renewal rule of the parameter $\xi$ can be represented by the following Expression (5) for each learning data set:

$$\xi(t+1) = \xi(t) - \epsilon \frac{\partial r(x,\xi)}{\partial \xi} \qquad (5)$$

$$= \xi(t) - \epsilon \sum_{c=1}^{n_o} (y_c - z_c) \nabla_\xi y_c.$$

In Expression 5, $\epsilon$ is a learning coefficient and is a sufficiently small positive constant.

$\nabla \xi$ is the gradient of the parameter $\xi$. When $\nabla \xi y_c$ is rewritten, the following Expressions (6) to (8) are given:

$$\frac{\partial y_c}{\partial w_b^i} = \delta_{ci} B_b(x), \qquad (6)$$

$$\nabla_{\mu_b} y_c = \frac{(x - \mu_b)}{\sigma_b^2} B_b(x)(w_b^c - y_c), \qquad (7)$$

$$\frac{\partial y_c}{\partial \sigma_b} = \frac{(x - \mu_b)^2}{\sigma_b^3} B_b(x)(w_b^c - y_c). \qquad (8)$$

As illustrated in the following Expressions (6) to (8), depending on learning data in which one neuron 8 of the intermediate layer 4 is dominant, the synaptic weight w of the neuron 8 is learned. Depending on learning data in which a plurality of neurons 8 of the intermediate layer 4 affect an output, the synaptic weight w, the reaction center μ, and the reaction width σ of the plurality of neurons 8 are learned. A method for calculating the loss function and correcting the synaptic weight w is not limited to the above-mentioned method and various known methods may be used. As the loss function, for example, a function based on a cross-entropy error may be used, in addition to the function based on a square error.

In the synaptic weight correction process, when a neuron 8 is newly generated by the neuron generation process which will be described below or when some of the neurons 8 are removed by the neuron removal process which will be described below, the loss function of the neural network 1 is calculated again using the read learning data and the synaptic weight w of the neural network 1 is corrected again according to the loss function.

The neuron generation unit 36 performs the neuron generation process. The neuron generation process newly generates a neuron 8 in the intermediate layer 4 of the neural network 1 when the calculated loss function is greater than the first threshold value th_e after the synaptic weight correction unit 34 performs the synaptic weight correction process. In the neuron generation process, after the synaptic weight correction process is performed, it is determined whether the loss function calculated by the synaptic weight correction process is greater than the first threshold value th_e, a variation in the loss function is less than the reference variation th_d, and the number of times the structure is not changed is greater than the reference number of times th_c. When the determination result is "Yes", one neuron 8 having the parameter $\xi$ with a predetermined value is generated in one or a plurality of intermediate layers 4 in which the neuron 8 is to be generated.

For example, the parameter $\xi$ of the neuron 8 to be newly added can be set as illustrated in the following Expressions (9) to (11):

$$\mu_{n_m+1} = x, \qquad (9)$$

$$w_{n_m+1} = y^{(n_m)}(x) - \frac{y^{(n_m)}(x) - z(x)}{B_{n_m+1}^{(n_m+1)}(x)} \qquad (10)$$

$$\sigma_{n_m+1}^2 = \gamma \sum_{a=1}^{n_m} (x - \mu_a)^2 B_a^{(n_m)}(x). \qquad (11)$$

In the above-mentioned expressions, $y^{(nm)}$ is output data from the neural network 1 in which the number of neurons in the intermediate layer 4 is $n_m$ and $B^{(nm+1)}{}_{nm+1}$ is the reaction strength of an ($n_m$+1)-th element in the neural network 1 in which the number of neurons in the intermediate layer 4 is ($n_m$+1). In addition, $\gamma$ is a positive constant for determining the locality of the reaction width.

In the neuron generation process, when one intermediate layer 4 is provided in the neural network 1, the intermediate layer 4 may be an intermediate layer (hereinafter, referred to as a "generation target intermediate layer") in which the neuron 8 is to be generated. When a plurality of intermediate layers 4 are provided in the neural network 1, at least one of the plurality of intermediate layers 4 may be used as the generation target intermediate layer. When an additional intermediate layer is generated as a new intermediate layer 4 by the intermediate layer generation process which will be described below, the newly generated additional intermediate layer may be used as the generation target intermediate layer. The selection of the generation target intermediate layer is not particularly limited. A known method may be used to select the generation target intermediate layer.

The number of neurons generated by the neuron generation process is not limited to one. A plurality of neurons 8 may be generated. In addition, the generation of the neuron 8 by the neuron generation process is not limited to the above-mentioned method. Various known methods may be used.

The neuron removal unit 38 performs the neuron removal process. When the sum of the synaptic weights w of a plurality of neurons 8 in the intermediate layer 4 of the neural network 1 is less than the reference sum th_w after the synaptic weight correction unit 34 performs the synaptic weight correction process, the neuron removal process removes some of the neurons 8 in the intermediate layer 4. In the neuron removal process, after the synaptic weight correction process is performed, it is determined whether the sum of the synaptic weights w of the neurons 8 in one or a plurality of intermediate layers 4 in which the neuron 8 is to be removed is less than the reference sum th_w, the number of neurons is greater than the reference number of neurons th_n, and the number of times the structure is not changed is greater than the reference number of times th_c. When the determination result is "Yes", one or a plurality of neurons 8 in the intermediate layer 4 are removed.

For example, the neuron 8 to be removed can satisfy the following Expression (12) when it is removed. The synaptic weight w may be corrected according to the following Expression (13) in order to reduce a change in output data due to the removal of the neuron 8:

$$\frac{1}{2}(\delta_y(\mu_b))^2 < \theta \qquad (12)$$

$$w_a \to w_a + (w_b - w_a)B_b^{2m}(\mu_a). \qquad (13)$$

In the above-mentioned expression, $\theta$ is a positive constant for determining the easiness of the removal of the neuron 8.

In the neuron removal process, when one intermediate layer 4 is provided in the neural network 1, the intermediate layer 4 may be used as an intermediate layer (hereinafter, a "removal target intermediate layer") in which the neuron 8 is to be removed. When a plurality of intermediate layers 4 are provided in the neural network 1, at least one of the plurality of intermediate layers 4 may be used as the removal target intermediate layer. When an additional intermediate layer is generated as a new intermediate layer 4 by the intermediate layer generation unit 40 which will be described below, the newly generated additional intermediate layer may be used as the removal target intermediate layer. The removal target intermediate layer may be the same intermediate layer as the generation target intermediate layer in the neuron generation process. The selection of the removal target intermediate layer is not particularly limited. A known method may be used to select the removal target intermediate layer. In addition, the removal of the neuron 8 by the neuron removal process is not limited to the above-mentioned method. Various known methods may be used.

In the above description, the variation in the loss function is the difference between the loss function which has been previously calculated and the loss function which is currently calculated in the synaptic weight correction process that is repeatedly performed. The variation in the loss function can be calculated by, for example, storing each loss function in a plurality of consecutive synaptic weight correction processes in the synaptic weight correction unit 34. The number of times the structure is not changed is the number of synaptic weight correction processes in which the structure of the network (the number of neurons) is maintained without being changed, among the synaptic weight correction processes which are repeatedly performed. For example, the number of times the structure is not changed can be calculated as follows. The number of times the structure is not changed is counted whenever the synaptic weight correction unit 34 performs the synaptic weight correction process and the count is cleared when the number of neurons is increased or decreased by the neuron generation process and the neuron removal process.

The first threshold value th_e, the reference variation th_d, and the reference number of times th_c are set in advance in order to appropriately determine whether to generate the neuron 8 using the neuron generation process. The reference sum th_w, the reference number of neurons th_n, and the reference number of times th_c are set in advance in order to appropriately determine whether to remove the neuron 8 using the neuron removal process. These values may be fixed values or variables. For example, these values can be empirically or theoretically obtained.

The intermediate layer generation unit 40 performs the intermediate layer generation process. The intermediate layer generation process newly generates an additional intermediate layer including at least one neuron 8 as the intermediate layer 4 of the neural network when the calculated loss function is greater than the second threshold value th_e2 after the learning unit 30 performs the learning process. The intermediate layer generation process determines whether the loss function calculated by the synaptic weight correction process is greater than the second threshold value th_e2 and the number of additional intermediate layers generated by the intermediate layer generation process is less than a reference addition number N1, after the learning process is performed. When the determination result is "Yes", one additional intermediate layer is newly generated and the total number of intermediate layers 4 increases. The number of additional intermediate layers can be calculated by, for example, counting the number of additional intermediate layers generated whenever the intermediate layer generation unit 40 generates an additional intermediate layer using the intermediate layer generation process.

For example, the intermediate layer generation process newly generates an additional intermediate layer as the intermediate layer 4 between the intermediate layer 4 which is closest to the output layer 6 and the output layer 6 in the neural network 1. The number of neurons 8 in the additional intermediate layer may be one or two or more. The synaptic weight w of the neuron 8 in the additional intermediate layer is a predetermined initial weight value. The position where the additional intermediate layer is generated in the neural network 1 is not particularly limited. The additional intermediate layer may be generated between a plurality of intermediate layers 4 or between the intermediate layer 4 that is closest to the input layer 2 and the input layer 2. The number of additional intermediate layers generated may be one or two or more.

In this embodiment, when the additional intermediate layer is newly generated as the intermediate layer 4 by the intermediate layer generation process, the learning unit 30 performs the learning process again using the neural network 1 in which the additional intermediate layer has been generated. That is, when a new neural network 1 including the additional intermediate layer generated by the intermediate layer generation process as the intermediate layer 4 is constructed, the learning unit 30 performs the data reading process, the synaptic weight correction process, the neuron generation process, and the neuron removal process described above again in the new neural network 1.

Next, an example of the learning process and the intermediate layer generation process performed by the neural network learning device 100 will be described with reference to a flowchart illustrated in FIG. 3.

First, the calculation unit 12 has the neural network 1 with the initial structure acquired by the initial structure acquisition unit 10. As described above, the database 20 stores a plurality of learning data sets, the first threshold value th_e, the reference variation th_d, the reference number of times th_c, the reference sum th_w, the reference number of neurons th_n, the second threshold value th_e2, and the reference addition number N1 in advance. In the neural network 1 with the initial structure, one intermediate layer 4 is provided and the synaptic weight w of each neuron 8 is an initial weight value.

Figure 3:
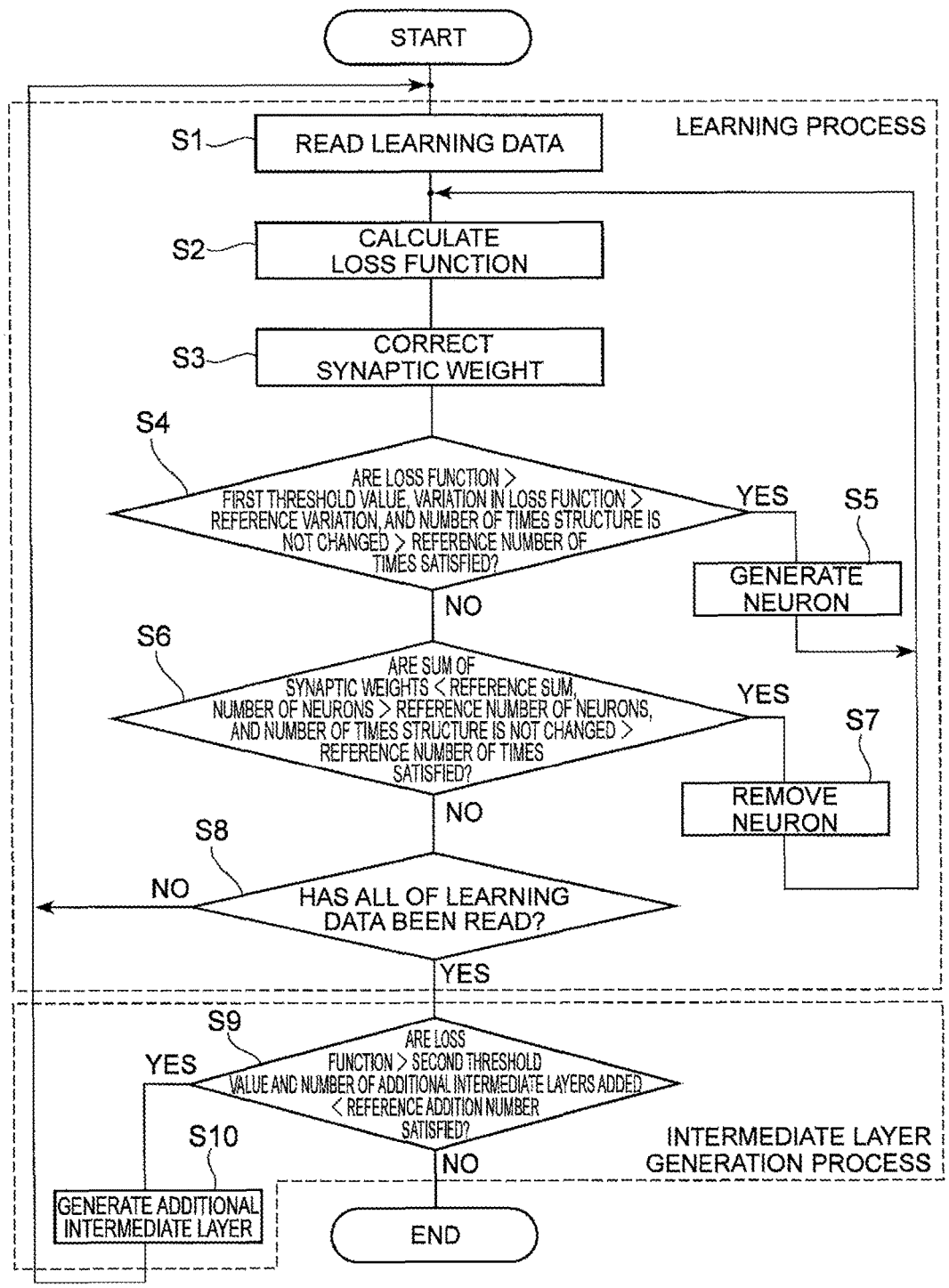
FIG. 3 is a flowchart illustrating a process of the neural network learning device illustrated in FIG. 1.

In the neural network learning device 100, as illustrated in FIG. 3, the learning data reading unit 32 reads learning data from the database 20 (S1). The synaptic weight correction unit 34 calculates a loss function using the learning data and corrects the synaptic weight according to the loss function (S2 and S3).

The neuron generation unit 36 determines whether the calculated loss function is greater than the first threshold value th_e, a variation in the loss function is less than the reference variation th_d, and the number of times the structure is not changed is greater than the reference number of times th_c (S4). When the determination result in S4 is "YES", the neuron generation unit 36 generates a new neuron 8 in the intermediate layer 4 which is the generation target intermediate layer (S5). After S5, the process returns to S2 and the synaptic weight correction unit 34 calculates a loss function again, using the learning data, and corrects the synaptic weight w again according to the loss function.

When the determination result in S4 is "NO", the neuron removal unit 38 determines whether the sum of the synaptic weights w is less than the reference sum th_w, the number of neurons is greater than the reference number of neurons th_n, and the number of times the structure is not changed is greater than the reference number of times th_c, in the intermediate layer 4 which is the removal target intermediate layer (S6). When the determination result in S6 is "YES", the neuron removal unit 38 removes some of the neurons 8 in the intermediate layer 4 which is the removal target intermediate layer (S7). After S7, the process returns to S2 and the synaptic weight correction unit 34 calculates a loss function again, using the learning data, and corrects the synaptic weight w again according to the loss function.

When the determination result in S6 is "NO", it is determined whether the learning data reading unit 32 has read all of the plurality of learning data sets stored in the database 20 (S8). When the determination result in S8 is "NO", the process returns to S1 and the learning data reading unit 32 reads the learning data which has not been read among the plurality of learning data sets.

When the determination result in S8 is "YES", it is determined whether the loss function is greater than the second threshold value th_e2 and the number of additional intermediate layers added is less than the reference addition number N1 (S9). When the determination result in S9 is "YES", the intermediate layer generation unit 40 newly generates an additional intermediate layer as the intermediate layer 4 and constructs a neural network 1 with a new structure (S10). After S10, the process returns to S1 and the learning unit 30 performs the learning process again using the neural network 1 in which the additional intermediate layer has been generated. When the determination result in S9 is "NO", the process ends and the optimization of the neural network 1 is completed.

As described above, according to the neural network learning device 100, it is possible to adjust the number of neurons 8 to an optimal value corresponding to the loss function and the synaptic weight w. In addition, it is possible to adjust the number of intermediate layers 4 to an optimal value corresponding to the loss function. Therefore, it is possible to optimize the structure of the neural network 1.

S1 to S8 correspond to the learning process, S1 and S8 correspond to the data reading process, S2 and S3 correspond to the synaptic weight correction process, S4 and S5 correspond to the neuron generation process, and S6 and S7 correspond to the neuron removal process. In addition, S9 and S10 correspond to the intermediate layer generation process.

The embodiment of the invention has been described above. However, the invention is not limited to the above-described embodiment and is embodied in various ways.

In the above-described embodiment, the database 20 may be provided in another computer which can communicate with the neural network learning device 100. The initial structure acquisition unit 10 may be provided separately from the neural network learning device 100 or may not be provided according to circumstances.

In the above-described embodiment, in the neuron generation process, it is determined whether the loss function is greater than the first threshold value th_e, the variation in the loss function is less than the reference variation th_d, and the number of times the structure is not changed is greater than the reference number of times th_c (see S4). The determination conditions are not particularly limited. For example, in the neuron generation process, the neuron 8 may be generated when the loss function is greater than the first threshold value th_e. Since the determination conditions for generating a neuron include "whether the variation in the loss function is less than the variation th_d", it is possible to supplement a portion which is not capable of being supplemented by general learning, using the correction of the structure by the generation of neurons, after waiting for convergence by general learning. Since the determination conditions for generating a neuron include "whether the number of times the structure is not changed is greater than the reference number of times th_c", similarly, it is possible to correct the structure after waiting for convergence by general learning.

In the above-described embodiment, in the neuron removal process, it is determined whether the sum of the synaptic weights w is less than the reference sum th_w, the number of neurons is greater than the reference number of neurons th_n, and the number of times the structure is not changed is greater than the reference number of times th_c (see S6). However, the determination conditions are not particularly limited. For example, in the neuron removal process, some of the neurons 8 may be removed when the sum of the synaptic weights w is less than the reference sum th_w. In addition, since the determination conditions for removing a neuron include "whether the number of neurons is greater than the reference number of neurons th_n", it is possible to prevent the number of neurons from being abnormally small (for example, the number of neurons becomes 0 and the layer disappears). Since the determination conditions for removing a neuron include "whether the number of times the structure is not changed is greater than the reference number of times th_c", it is possible to correct the structure after waiting for convergence by general learning, similarly to the above-mentioned case in which the determination conditions for generating a neuron include whether the number of times the structure is not changed is greater than the reference number of times th_c.

In the above-described embodiment, in the intermediate layer generation process, it is determined whether the loss function is greater than the second threshold value th_e2 and the number of additional intermediate layers added is less than the reference addition number N1 (see S9). However, the determination conditions are not particularly limited. For example, in the intermediate layer generation process, the additional intermediate layer may be generated when the loss function is greater than the second threshold value th_e2.

In the learning process illustrated in FIG. 3, after the neuron generation process (S4 and S5) of the neuron generation unit 36, the neuron removal process (S6 and S7) of the neuron removal unit 38 is performed. However, inversely, the neuron generation process may be performed after the neuron removal process. In the learning process illustrated in FIG. 3, the reading of the learning data is repeated until all of a plurality of learning data sets are read. However, the reading of the learning data may be repeated until all of a plurality of learning data sets are read N times (N is an integer that is equal to or greater than 1).

According to the invention, it is possible to provide a neural network learning device which can optimize the structure of a neural network.

What is claimed is:

1. A neural network learning device that learns a hierarchical neural network having an input initial structure or a predetermined initial structure, comprising:
   a learning unit configured to perform a learning process that learns the neural network using a plurality of learning data sets,
   wherein the learning process includes:
   a data reading process that reads the learning data from a database;

a synaptic weight correction process that calculates a loss function of the neural network using the learning data and corrects a synaptic weight of the neural network according to the loss function, when the learning data is read by the data reading process;

a neuron generation process that newly generates a neuron in an intermediate layer of the neural network when the loss function is greater than a predetermined first threshold value after the synaptic weight correction process is performed; and a neuron removal process that removes some of the neurons in the intermediate layer when the sum of the synaptic weights of a plurality of neurons in the intermediate layer of the neural network is less than a predetermined reference sum after the synaptic weight correction process is performed, when the neuron is newly generated by the neuron generation process or when some of the neurons are removed by the neuron removal process, the synaptic weight correction process calculates the loss function again, using the learning data, and corrects the synaptic weight again according to the loss function, the neural network learning device further includes an intermediate layer generation unit configured to perform an intermediate layer generation process that newly generates an additional intermediate layer including at least one neuron as the intermediate layer of the neural network when the loss function is greater than a predetermined second threshold value after the learning process is performed, and when the additional intermediate layer is newly generated by the intermediate layer generation process, the learning unit performs the learning process again, using the neural network in which the additional intermediate layer has been generated.

\* \* \* \* \*